Dec. 19, 1967   W. F. BERCK ETAL   3,358,921
TAX-COMPUTING METERING DEVICE
Filed May 9, 1966   4 Sheets-Sheet 1
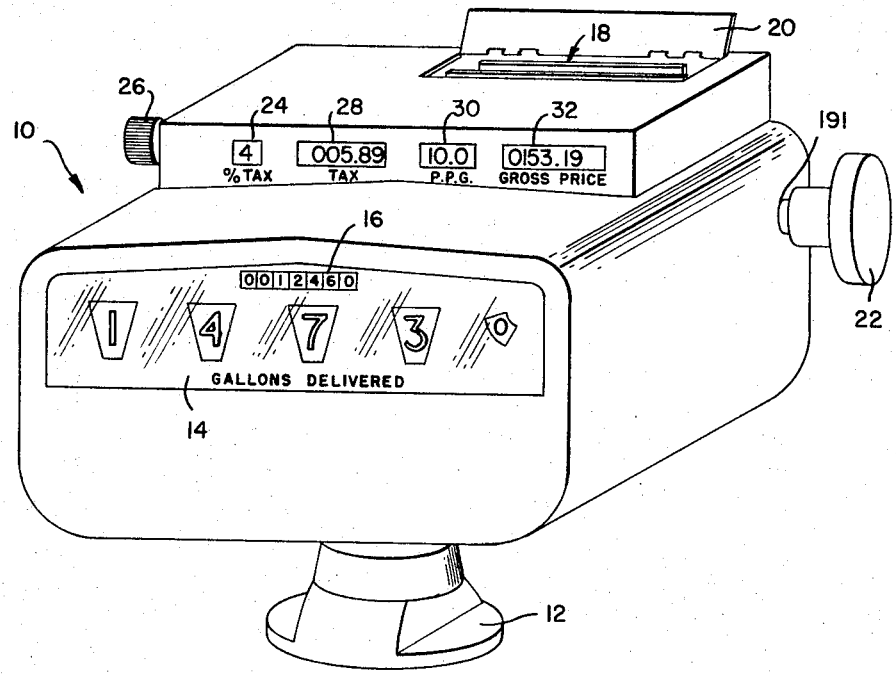
FIG_1
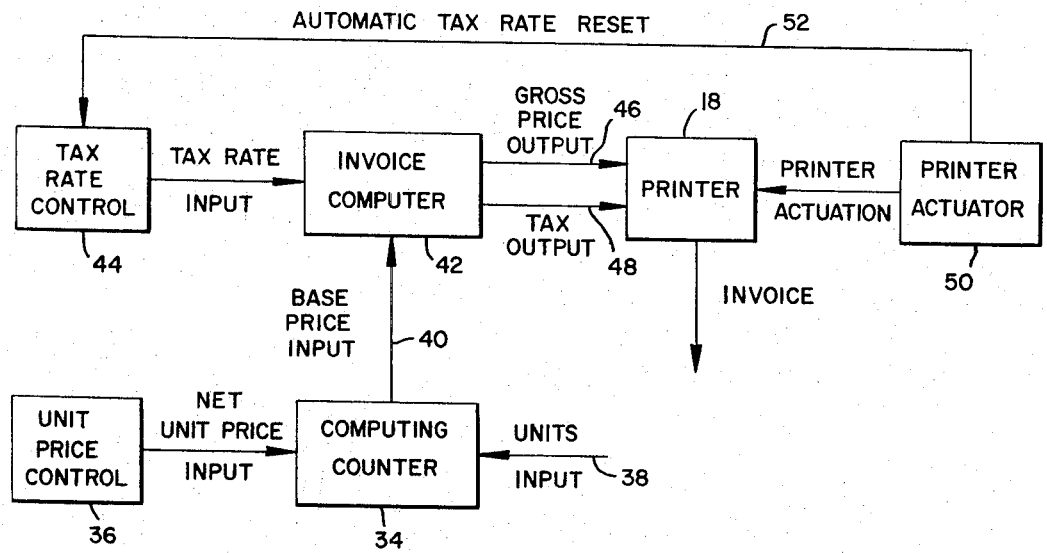
FIG_2
*INVENTORS*
WILLIAM F. BERCK
LEIF J. SUNDBLOM
Mellin, Moore + Weissenberger
ATTORNEYS Dec. 19, 1967   W. F. BERCK ETAL   3,358,921
TAX-COMPUTING METERING DEVICE
Filed May 9, 1966   4 Sheets-Sheet 2
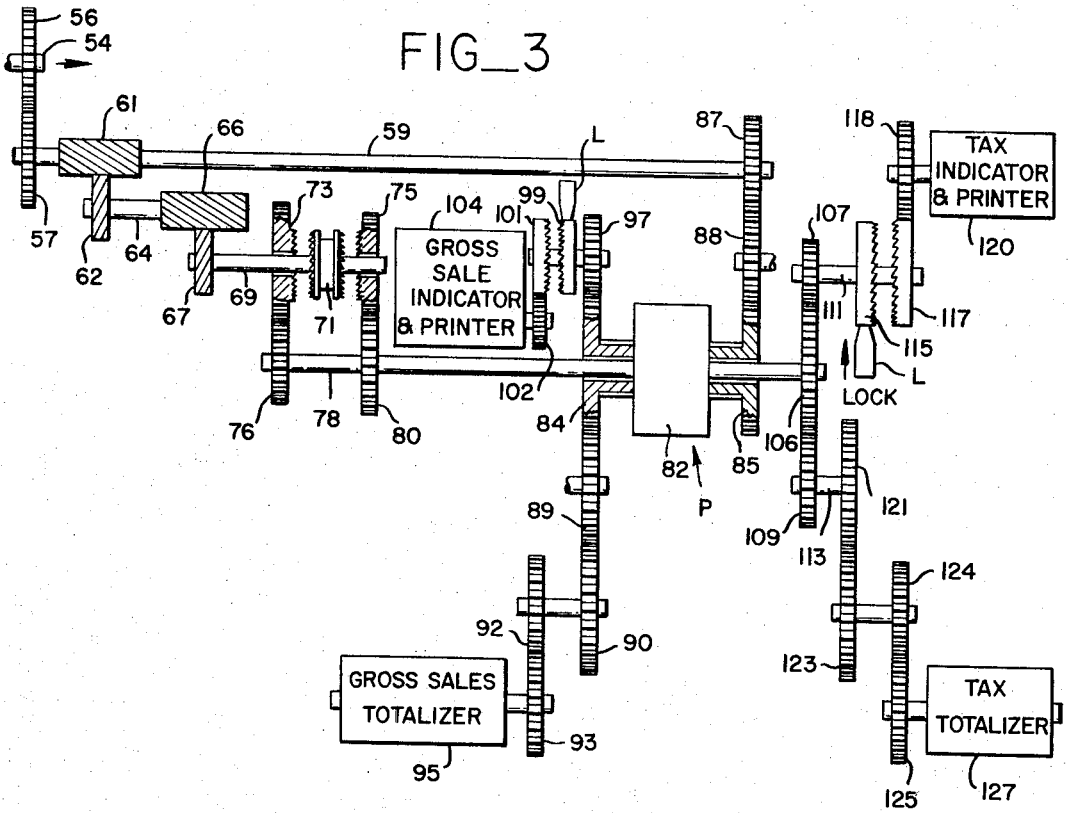
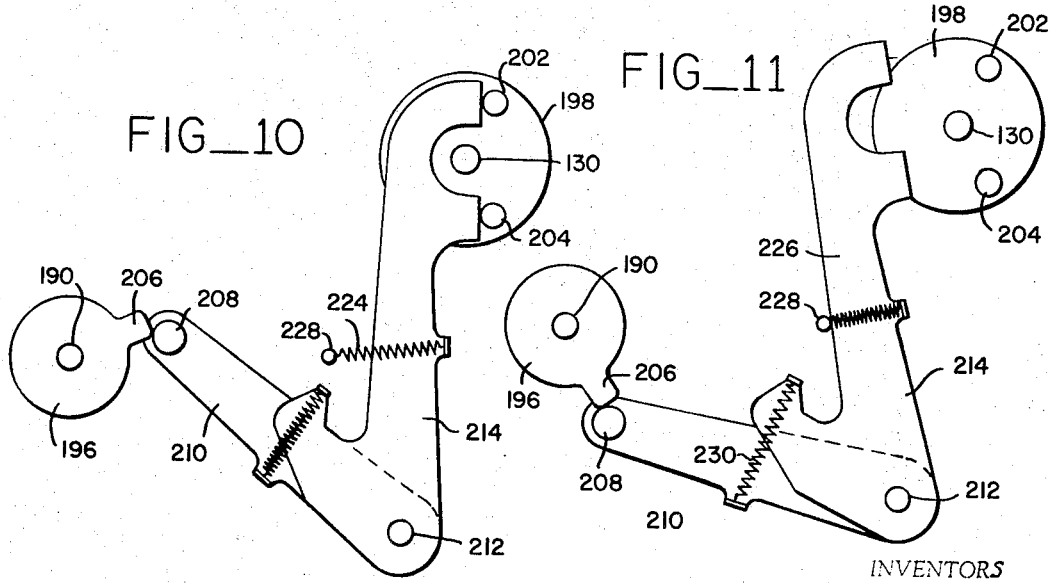
INVENTORS
WILLIAM F. BERCK
LEIF J. SUNDBLOM
ATTORNEYS Dec. 19, 1967  W. F. BERCK ET AL  3,358,921
TAX-COMPUTING METERING DEVICE
Filed May 9, 1966  4 Sheets-Sheet 3
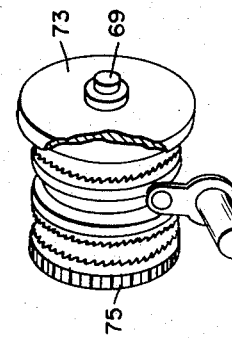
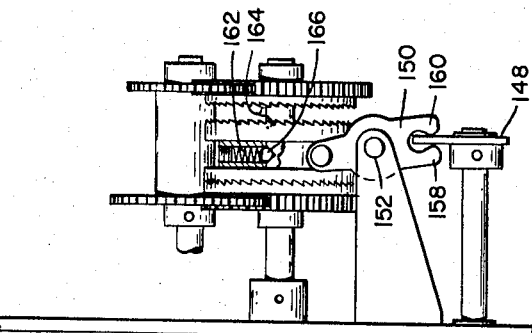
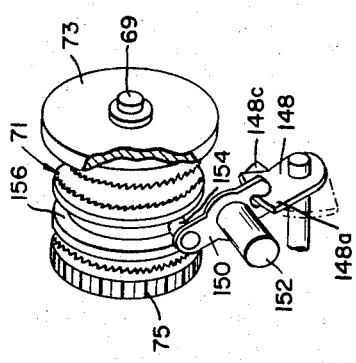
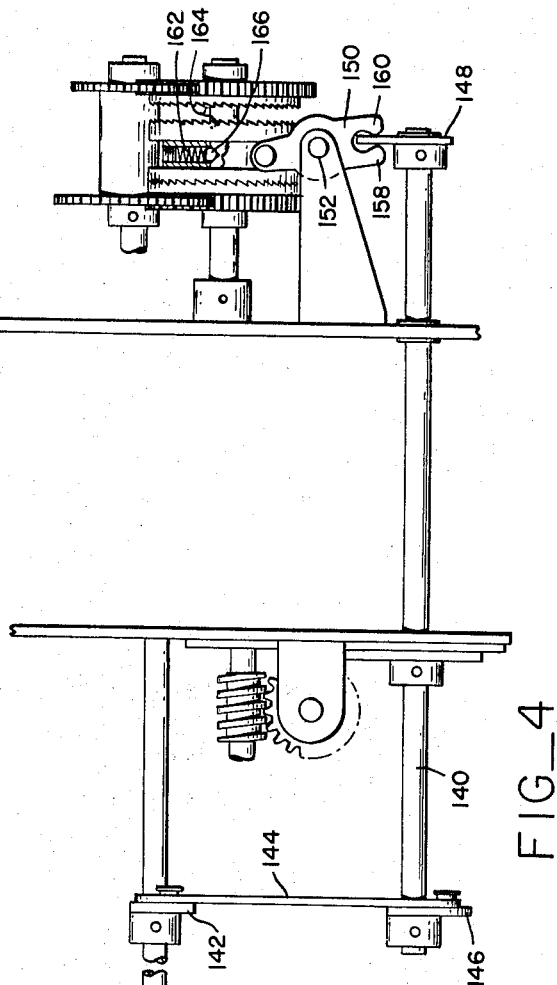
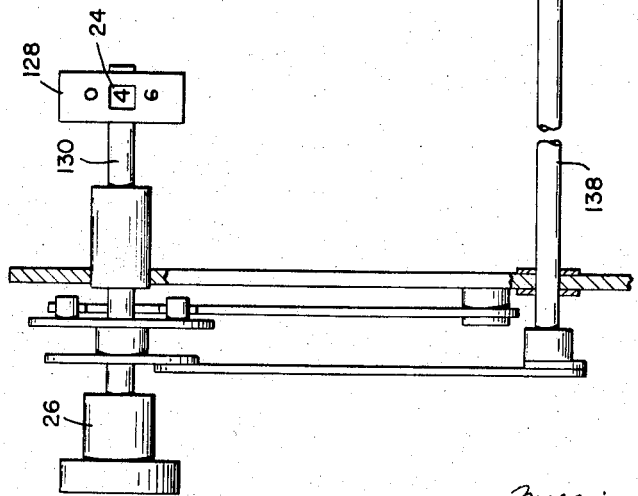
INVENTORS
WILLIAM F. BERCK
LEIF J. SUNDBLOM
ATTORNEYS Dec. 19, 1967
W. F. BERCK ETAL
3,358,921
TAX-COMPUTING METERING DEVICE
Filed May 9, 1966
4 Sheets-Sheet 4
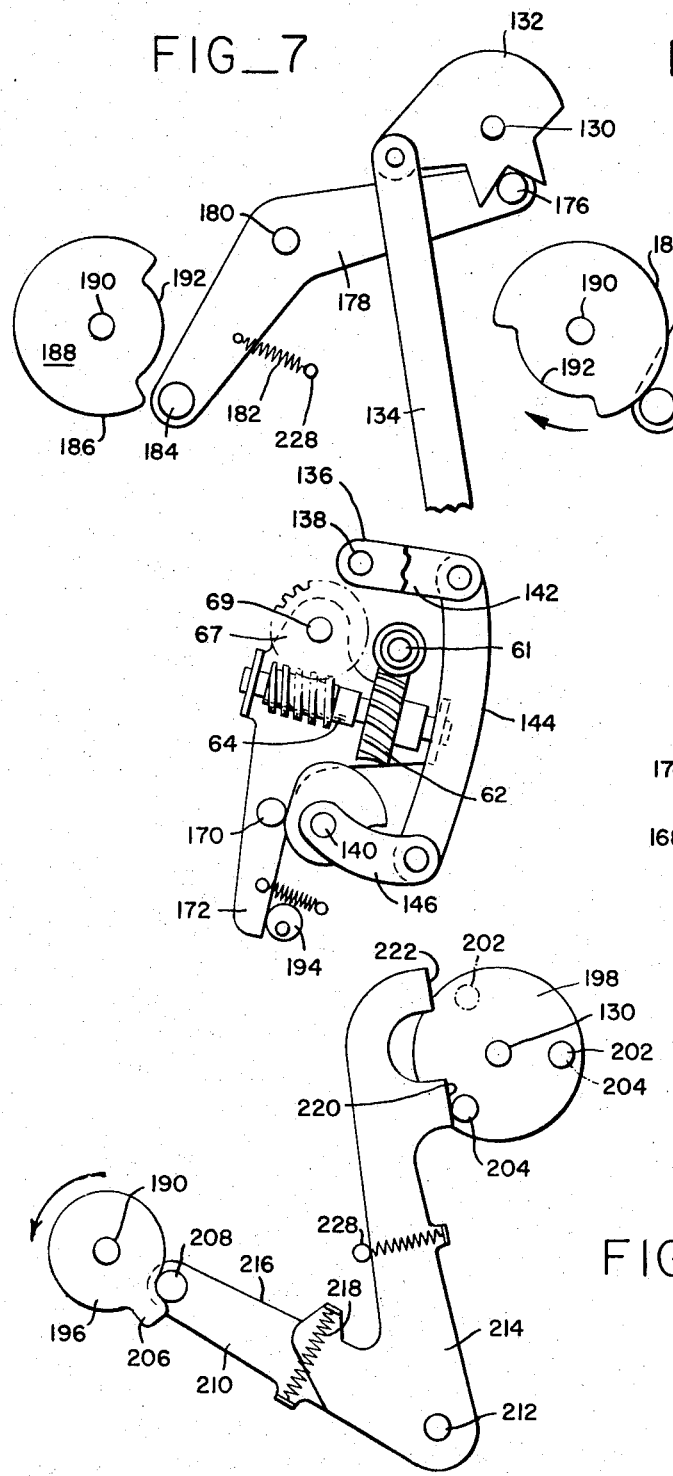
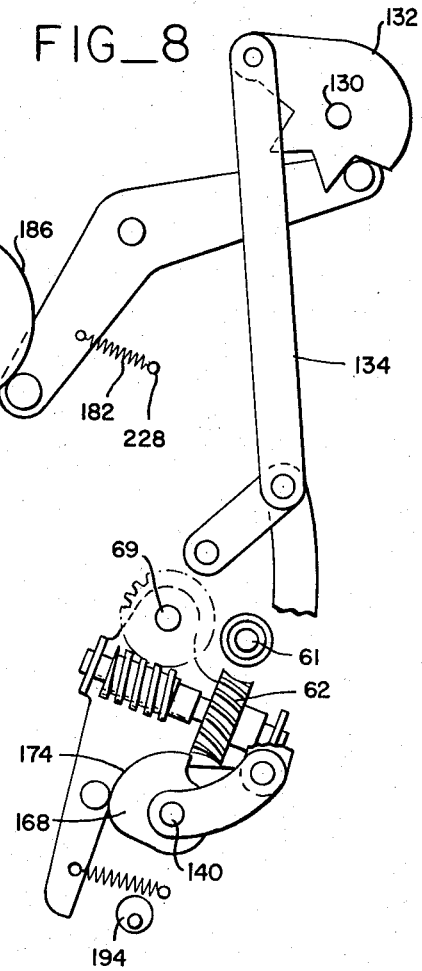
INVENTORS
WILLIAM F. BERCK
LEIF J. SUNDBLOM
ATTORNEYS

United States Patent Office 3,358,921
Patented Dec. 19, 1967

3,358,921
TAX-COMPUTING METERING DEVICE
William F. Berck, Hayward, and Leif J. Sundblom,
Castro Valley, Calif., assignors to Rockwell Manufacturing Company, San Leandro, Calif., a corporation of Pennsylvania
Filed May 9, 1966, Ser. No. 548,718
12 Claims. (Cl. 235—94)

ABSTRACT OF THE DISCLOSURE

This invention concerns a variable tax rate metering device for fluids which is capable of providing a no-tax condition in addition to two non-zero tax rates and which provides a permanent record to total sale price and the tax involved in each transaction. Means are also provided to automatically reset a tax rate selector to the most standard tax rate upon operation of the print-out or resetting mechanism and to prevent the operation of the rate selector during a metering operation.

---

Bulk oil product merchants customarily deliver their products to customers in tank trucks which deliver the fluid to the customers' storage tanks. The fluid sold is metered by a truck-mounted computer as it is discharged from the tank truck. These metering computers are preferably arranged so as to provide a printed invoice stating the gallonage delivered, the price per gallon, and the total purchase price for the delivery. In addition, the metering device also keeps a permanent record of the total deliveries made from the truck for audit and bookkeeping purposes.

Unlike a conventional service station, which caters almost exclusively to private vehicles in a fixed location, a fuel oil delivery truck might serve a number of customers of different types in various locations. For example, it might serve a municipal or state agency which is exempt from state tax. On the other hand, it might service customers within a municipality which levies an extra tax above and beyond the tax rate prevailing in the surrounding countryside. In addition, a knowledge of the precise amount of tax charged on each transaction is likely to be important to both the merchant and the customer, because the customer may be able to deduct it from his income taxes, and the merchant must know how much tax he has to turn over to the taxing authorities.

The problem consequently arises of designing a tax computing mechanism capable of continuously computing a tax based on a percentage of the dollar value of a transaction. This tax computing means must be capable of readily accepting any tax percentage from at least 1% to 6% in increments of $2/10$ of 1% and including $\frac{1}{2}\%$ increments, for example:

1%         1.6%
1.2%       1.8%
1.4%       2%
1.5%       etc. up to and including 6%.

For a mechanism to be practical, it must be possible to change any of these percentages to any other by changing not more than one pair of gears.

A brief study will disclose that to accomplish this objective simply is quite difficult and would necessitate the employment of outsize gears with large numbers of teeth. For example: $1\% = 10/1000$, $3\% = 15/500$, $5.5\% = 11/200$.

In addition it will be seen that it would be difficult to place the gears involved in these various percentages on common centers even if widely varying diametrical pitches were used.

It is highly undesirable, from both the user's and the manufacturer's point of view, to devise a tax computing system based on a variety of compound ratios whereby it would be necessary to change four or more gears to obtain a new tax percentile.

The system of this invention is based on the use of a compounded gear ratio in which one portion of the compounded ratio is a constant and by merely changing a pair of pick off gears the entire range of desired tax may be obtained.

It is, therefore, the primary object of this invention to provide a tax computing mechanism which is capable of computing at any one of some thirty different tax rates by changing a single pair of normal-sized gears.

In the practical application mentioned above, the basic concept of a compounded gear ratio algebraically combining a fixed portion with a variable portion to permit small variations of the ratio within the capabilities of practically useable components is expanded to include the ability of the mechanism to be selectively set to two or more ratios without any gear change at all. In addition, the particular embodiment of the invention described herein provides means to obviate the human error of forgetting to reset the tax rate selector, by automatically resetting the tax rate selector to the most standard rate upon operation of the print-out or dial resetting mechanism at the end of each delivery at an unusual tax rate.

It is, therefore, a further object of this invention to provide a computing meter of the type described in which the tax rate may readily be varied from one transaction to the next.

It is a further object of this invention to provide a computing fluid meter of the type described in which the tax rate is normally set to the most common tax rate prevailing in the area, and in which the tax rate setting device will automatically return to the most common rate setting after the completion of the delivery at a different tax rate.

These and other objects of the invention will become apparent from a perusal of the following specification, taken in connection with the accompanying drawings in which:

FIG. 1 is a perspective view of a typical device embodying the invention;

FIG. 2 is a block diagram illustrating the manner of operation of the device of FIG. 1;

FIG. 3 is a flow diagram schematically illustrating the mechanical sequence of movement involved in the operation of the device of the invention;

FIG. 4 is a vertical cross-section of a typical embodiment of the device showing the manner of operation of the tax-rate selector mechanism;

FIG. 5 is a perspective detail view showing the tax-rate selector clutch in its standard position, with its no-tax position indicated in phantom lines;

FIG. 6 is a view similar to FIG. 5 but showing the clutch in the extra-tax position;

FIG. 7 is a fragmentary side elevation of the tax selector mechanism showing it in the unlocked standard position;

FIG. 8 is a view similar to FIG. 7 but showing the mechanism in the no-tax and locked position;

FIG. 9 is a fragmentary elevation of the tax rate reset mechanism in its inactive position;

FIG. 10 is a view similar to FIG. 9 but showing the tax rate reset mechanism in its active position; and FIG. 11 is a view similar to FIG. 9 but illustrating the manner in which actuation of the reset mechanism is avoided during the setting operation of the printing mechanism.

Basically, the invention has four distinct aspects:
(1) The capability of the mechanism to be set to a large number of standard incremental ratios at low percentiles of the input by changing only one pair of normal-sized gears;

(2) The automatic separate computation of a tax, coupled with separate output indications representative respectively, of the tax alone and of the total price including tax;

(3) The ability of the mechanism to compute tax at several selectable rates including zero; and (4) The ability of the tax rate selection mechanism to reset itself automatically to the most standard tax rate immediately in the course of the print-out following the completion of a computation of a non-standard tax rate.

Ratio variation

The crux of this aspect of the invention rests on the recognition that an incremental ratio change at low percentiles of an input quantity can be greatly simplified by first reducing the quantity by a fixed ratio to a level at which the increments desired are more or less evenly distributed over the entire scope of the reduced quantity.

Specifically, the basic or constant ratio portion of this compounded drive is obtained in the following manner. Referring to FIG. 3, the ratio of worm gear 61 to worm gear 62 is five to one. The ratio of worm gear 66 to worm gear 67 is ten to one. This output is delivered through either of two pairs of pick-off gears 73/76 or 75/80 to shaft 78 to which the cage 82 of a planetary system is fixed. In a planetary system of this type, if the input gear 85 is fixed and the cage 82 is rotated one revolution, the output gear 89 rotates two revolutions. In other words the resultant ratio is a two-to-one speed-up. The final constant ratio of the gear system comprised by 61/62, 66/67, shaft 80 cage 82 is 1/25. In other words, if clutch 71 were in contact with gear 73 and the ratio of 73 to 76 were 1/1, one revolution of shaft 59 would result in 1/25 of a revolution of gear 84.

The following examples readily show how the desired result is achieved by the use of normal-sized exchangeable pick-off gear pairs:

| FOR .5% INCREMENTS | | |
|---|---|---|
| Constant Ratio | Pick-Off Gears 73/76 or 75/80 | Percent Tax |
| 1/25 | 12/58 | 1 |
| 1/25 | 18/48 | 1.5 |
| 1/25 | 20/40 | 2 |
| 1/25 | 25/40 | 2.5 |
| 1/25 | 27/36 | 3 |
| 1/25 | 28/32 | 3.5 |
| 1/25 | 30/30 | 4 |
| 1/25 | 36/32 | 4.5 |
| 1/25 | 35/28 | 5 |
| 1/25 | 33/24 | 5.5 |
| 1/25 | 36/24 | 6 |
| FOR .2% INCREMENTS | | |
| 1/25 | 12/40 | 1.2 |
| 1/25 | 14/40 | 1.4 |
| 1/25 | 16/40 | 1.6 |
| 1/25 | 18/40 | 1.8 |
| 1/25 | 22/40 | 2.2 |
| 1/25 | 24/40 | 2.4 |
| 1/25 | 26/40 | 2.6 |
| 1/25 | 28/40 | 2.8 |
| 1/25 | 36/30 | 4.8 |
| 1/25 | 39/30 | 5.2 |
| 1/25 | 35/25 | 5.6 |

Tax computing mechanism

FIG. 1 shows the general nature of the device contemplated by this invention. The computing meter 10 might normally be mounted on a truck (not shown) by means of the pedestal 12. The location of the device 10 is so selected that it may be driven in synchronism with the fluid delivery from the truck by an appropriate prime move shaft (schematically shown as 38 in FIG. 2) projecting upwardly into the pedestal 12.

The meter 10 may have a resettable gallonage indicator 14 to indicate the gallonage delivered in a single delivery. This device may be combined with a non-resettable gallonage totalizer 16 indicating the total gallonage dispensed from the truck. Both of the elements 14 and 16 may be of conventional construction and are not further described herein. The meter 10 may further be equipped with a printer 18 into which an invoice can be introduced through the cover 20 for a written indication of the metered quantities at the beginning of a delivery and at the end thereof. The printer 18 is also of conventional construction and needs no further description herein. Typically, such a printer is arranged so that when the printer operating knob 22 is turned counter-clockwise as far as it will go (into its "compute" position) all resettable indicators or dials are reset to zero and an indication of this fact is printed onto the invoice inserted into the printer 18. After completion of the delivery, the knob 22 is turned clockwise as far as it will go (into its "home" position), which will produce an imprint of the then position of all resettable indicators onto the invoice in the printer 18.

The device of this invention may preferably have several other indicators as follows: The tax rate indicator 24 shows the rate at which the tax is being computed during the particular transaction. This indicator can be manually set to different predetermined values by the tax rate selector knob 26. An appropriate printing wheel of the printer 18 may be geared to selector knob 26 to print onto the invoice an indication of the tax rate selected.

The tax indicator 28 gives an indication of the tax appurtenant to a particular delivery. This indication is resettable, and the indicator 28 may be coupled in a well-known manner with a non-resettable totalizer schematically shown as 127 in FIG. 3 inside the machine for auditing purposes. The price-per-gallon indicator 30 shows the net unit price (exclusive of tax) of the fluid. This indicator can be set to any desired value by means of the price selector mechanism schematically shown as 36 in FIG. 2, one form of which is disclosed in our co-pending application Ser. No. 412,974 filed Nov. 23, 1964, now Patent No. 3,317,129. The gross price indicator 32 provides an indication of the gross price of the delivery, and this indication is resettable. As in the case of the indicator 28, the indicator 32 may be coupled in a well-known manner with a non-resettable totalizer (schematically shown as 95 in FIG. 3) inside the machine which will continuously register total gross sales from the truck for auditing purposes.

Turning now to FIG. 2, the operation of the device can generally be described as follows:

The computing counter 34 described in the aforesaid co-pending application Ser. No. 412,974 receives a price-per-gallon input from the unit price control mechanism 36 and a gallons delivered input from the drive shaft 38 of the delivering pump. The foregoing elements are all shown in the co-pending application Ser. No. 412,974, now Patent No. 3,317,129. The output 40 of the computing counter 34 is representative of the net price of the delivered amount of fluid and constitutes the net price input to the invoice computer 42 which is the subject of this invention. The tax rate control mechanism 44 operated by the knob 26 of FIG. 1 provides a tax rate input to the invoice computer 42.

The invoice computer 42 combines these two inputs and produces two distinct outputs, one of which is the gross price output 46 which actuates the indicator 32 of FIG. 1, and the other of which is the tax output 48 which actuates the indicator 38 of FIG. 1. Both of these outputs are fed to the printer 18 which prints the invoice when operated to that effect by the printer actuator mechanism 50. The printer actuator mechanism in turn is operated by turning the knob 22 of FIG. 1.

In accordance with one aspect of the invention, actuation of the printer actuator mechanism 50 also results in an automatic tax rate reset movement 52 which returns the tax rate control mechanism 44 to its normal position at the end of a delivery.

FIG. 3 schematically illustrates the manner in which the computation of the various quantities computed is typically effected in the device of this invention. In the following description of FIG. 3, the gears which turn in a clockwise direction when seen from the left are designated by even reference numerals, and the gears which turn in a counter-clockwise direction are indicated by odd numerals.

The shaft 54 corresponds to the net price input 40 in the diagram of FIG. 2 and is, in effect, the output shaft of the computing counter shown in co-pending application Ser No. 412,974 now Patent No. 3,317,129 (reference numeral 102 in FIG. 2 of that application). The shaft 54, and hence the gear 56 keyed thereto, rotate at a velocity proportional to the net price of the fluid being delivered from the truck. The motion of gear 56 is transmitted in a 1:1 ratio to gear 57 which is keyed to shaft 59. Shaft 59 supports a worm gear 61 which normally meshes with a pinion 62 mounted on shaft 64. The ratio of worm gear 61 to the pinion 62 may typically be 5:1. As will be later explained herein, the pinion 62 is disengageable from worm gear 61 when the tax rate selector is in the no-tax position.

Shaft 64 supports a worm gear 66 which meshes with a pinion 67 mounted on shaft 69. The ratio between worm gear 66 and pinion 67 may be 10:1. The shaft 69 supports an axially movable clutch member 71 which is shown in more detail in FIGS. 4 through 6. The gears 73 and 75 are concentric with shaft 69 but are not keyed thereto. When clutch 71 is moved to the left where it engages gear 73 it will transmit rotation from shaft 69 through gear 73 to gear 76 keyed to shaft 78. In that event, gear 80 keyed to shaft 78 will transmit its rotation to gear 75 and gear 75 will idle on shaft 69.

If, on the other hand, the clutch 71 is moved to the right where it engages gear 75, the rotation of shaft 69 is transmitted through clutch 71 and gear 75 to gear 80 and hence to shaft 78. In that event, gear 76 turns gear 73, and then idles on shaft 69. For illustrative purposes, it may be assumed that the device of the invention should be capable of computing tax at a 4% rate and at a 6% rate. If this is the case, the ratio between gears 73 and 76 might be 1:1.5, and the ratio between gears 75 and 80 might be 1:1. It will be understood that different gear ratios may be used for different tax rates.

It will be seen that in the example chosen, in which the tax is to be computed at 4%, the shaft 78 rotates at 2% of the speed of shaft 59 when the clutch 71 is in engagement with gear 75. This rotation of shaft 78 constitutes the velocity of rotation of the cage 82 of a planetary system P, whose operation is described in more detail at pages 5 and 6 of the co-pending application Ser. No. 412,974.

If its output, cage and input all turn in the same direction, the planetary system P satisfies the equation $$\omega_0 = 2\omega_c - \omega_i$$

in which $\omega_0$ is the angular velocity of the output sun gear 84, $\omega_c$ is the angular velocity of the planetary cage 82 which is affixed to shaft 78, and $\omega_i$ is the angular velocity of the input sun gear 85.

In the example chosen, the tax rate represented by the gears 75, 80 is 4%. In that case, the gears 75, 80 have a ratio of 1:1, and it will therefore be seen that shaft 78 turns at 2% of the angular velocity of the shaft 59. Applying these figures to the planetary system P and taking into account the fact that gears 87, 88 and 85 each have a 1:1 ratio to one another, it will be seen that the output gear 84 of the planetary system rotates at an angular velocity of $2\omega_{78} - \omega_{59}$. Inasmuch as shaft 59 (and hence input gear 85) turns in a direction opposite to that of shaft 78, $\omega_{59}$ is in fact a negative quantity and the output sun gear 84 will rotate at a velocity equal to the velocity of shaft 59, plus twice the velocity of shaft 78. In the example chosen, the output gear 84 therefore rotates at a velocity equal to 104% of the velocity of shaft 59 and therefore represents the price of the commodity plus a 4% tax.

The rotation of output gear 84 is transmitted through gears 89, 90, 92 and 93 to the gross sales totalizer counter 95. On the other side of output sun gear 84, its rotation is transmitted through gear 97 and the ratchet clutch arrangement 99, 101 and gear 102 to a resettable gross sale indicator and printer 104. The ratchet clutch member 99 is lockable against rotation during the dial-resetting operation of knob 22 by a locking mechanism L described in greater detail in the co-pending application entitled, "Safety Mechanism for Computing Counters," Ser. No. 548,557 filed concurrently herewith.

The rotation of shaft 78, which in the example chosen is 2% of that of shaft 59, is doubled by the ratio of gear 106 to gears 107 and 109, respectively. The resulting rotation of shafts 111 and 113 is therefore equal to the tax rate of 4% which has been chosen in this example. The rotation of shaft 111 is transmitted to the ratchet clutch 116, 117 and gear 118 to a resettable tab indicator and printer 120. The ratchet clutch member 116 is also lockable against rotation during the dial-resetting operation of knob 22 by a locking mechanism L. The rotation of shaft 113 is transmitted through gears 121, 123, 124 and 125 to the tax totalizer 127.

The indication of the gross sale indicator and printer 104 appears in window 32 of the device of FIG. 1, whereas the indication of the tax indicator 120 appears in window 28 of the device of FIG. 1.

Tax rate selection mechanism

It was pointed out in connection with FIG. 3 above that different tax rates can be selected in the device of the invention by moving clutch 71 into engagement with either gear 75 or gear 73. The operation of this mechanism is shown in more detail in FIGS. 4 through 8. In FIG. 4, the tax rate selector knob is shown at 26. This knob directly actuates an indicator wheel 128 which produces an indication of the selected tax rate in the window 24 of the device of FIG. 1. Mounted on the same shaft 130 which connects the knob 26 and the indicator wheel 128 is a star cam 132 (FIGS. 7 and 8) which transmits the motion of knob 26 through linkages 134, 136 to shaft 138 from which the same motion is transmitted to shaft 140 through linkages 142, 144, 146. Linkage 142 is directly behind linkage 136 in FIGS. 7 and 8.

The consequent rotation of shaft 140 is transmitted to the cam plate 148 which engages the clutch operation member 150 as best shown in FIGS. 5 and 6. The clutch operation member pivots on pin 152 and has a finger 154 which engages the groove 156 of the axially movable clutch member 71. In the example chosen, when the tax rate is either zero or 4%, the clutch operating member 150 is in the position shown in FIG. 5, in which the clutch member 71 engages gear 75. This is accomplished by the fact that the portion 148a and 148b of the cam plate 148 lie in the same plane perpendicular to shaft 140. It will be noted from FIG. 5 that in the 0% tax rate, the legs 158, 160 of clutch actuator member 150 are in engagement with portion 148a of cam plate 148, and that in the 4% position, they are in engagement with portion 148b.

As will be seen in FIG. 6, further rotation of shaft 140 brings the legs 158, 160 of the clutch actuator 150 into engagement with the portion 148c of the cam plate 148. The portion 148c is offset axially to the left in FIG. 6, and consequently the portion 148c rotates the clutch actuator member 150 about pin 152 so that finger 154 moves the clutch 71 out of engagement with gear 75 and into engagement with gear 73. As will be best seen in FIG. 4, a spring-loaded detent mechanism 162 is provided on the inside of the clutch 71. This mechanism cooperates with depressions 164, 166 to bias the clutch 71 into the engaged positions. When the clutch 71 is in engagement with either gear 75 or gear 73, the action of the detent 162 holds the groove 156 in a position where both of its sides are clear of finger 154. Thus drag-producing friction between finger 154 and clutch 71 during the operation of the counter is prevented.

The gear sets 75, 80 and 73, 76 are preferably interchangeable so that either set can be positioned in the "standard" position (left in FIGS. 4 through 6). If these gear sets are reversed, appropriate changes must of course be made in the tax rate indicator wheel 128 and in the corresponding print wheel (if any) of the printer 18. The gear sets 75, 80; 73, 76 and clutch 71 are preferably mounted at one end of the computer, as best shown in FIG. 4, to permit easy access thereto to carry out such modifications.

In the no-tax position, the drive for shaft 78 of FIG. 3 is disconnected at worm gear 61, 62 by the mechanism shown in FIGS. 7 and 8. This is accomplished by the cam 168 which is keyed to shaft 140. Upon rotation of the knob 26 from the 4% tax position shown in FIG. 7 to the no-tax position shown in FIG. 8, the pin 170 of supporting bracket 172 on which gears 66, 67 are mounted rides up onto the surface 174 of cam 168 and pivots the entire bracket 172 about shaft 69 until gear 62 becomes disengaged from gear 61 as shown in FIG. 8.

The star cam 132 is spring-biased to center itself in any of the three tax rate positions by means of a finger 176 affixed to an arm 178. The arm 178 is pivoted about pin 180 and is pulled into a position where the finger 176 engages the star wheel 132 by a spring 182. The other end of arm 178 carries a roller 184 which is positioned exactly tangentially to the surface 186 of cam 188 mounted on the cam shaft 190. In the described embodiment the cam shaft 190 is driven through a direction-reversing gear (not shown) by the shaft 191 of the printer actuator knob 22 of FIG. 1. It will be readily seen from FIGS. 7 and 8 that a change of the tax rate setting is possible only when the roller 184 is opposite the depressed portion 192 of the surface of the cam 188 (in all other positions of knob 22), the star wheel 132 is locked and the tax rate setting cannot be changed.

An adjustable eccentric 194 is provided to selectively limit the counter-clockwise movement of bracket 172 about shaft 69, for the purpose of adjusting the force with which worm pinion 62 engages the worm gear 61 when the tax rate computing mechanism is in engagement, as shown in FIG. 7.

*Tax rate resetting mechanism*

As can be best seen from FIGS. 9 through 11, the cam shaft 190 also carries a cam 196, and the rate selector knob shaft 130 also carries a disc 198. The disc 198 carries a pair of pins 202 and 204 which are in the position shown in solid lines in FIG. 9 when the tax rate selector is in the no-tax position, and in the position shown in dotted lines in the same figure when the tax rate selector is in the 6% position.

When, at the end of a delivery, the printer actuator knob 22 of FIG. 1 is rotated to its "home" position to print out the quantity delivered, the cam shaft 190 rotates in the direction of the arrow in FIG. 9. In due course, the nose 206 of cam disc 196 engages roller 208 mounted on arm 210. Arm 210 is journalled on pivot pin 212, as is the resetting fork 214. As nose 206 continues its counter-clockwise movement in FIG. 9, surface 216 of arm 210 bears against pin 218, which is a part of the resetting fork 214. Consequently, both the arm 210 and the resetting fork 214 pivot about the pivot pin 212 until the resetting fork assumes the position shown in FIG. 10. During this movement, the surface 220 of the resetting fork 214 bears against pin 204 and rotates the disc 198 in a counter-clockwise direction about shaft 130 until pins 202, 204 come to the position shown in FIG. 10, which is the position for the standard (4% in the described embodiment) tax setting. It will be understood that if the device had been in the 6% tax position, the surface 222 of the resetting for 214 would have borne against pin 202 in its dotted position and would have returned disc 198 in a clockwise direction to the position of FIG. 10.

When the resetting fork 214 has reached the position of FIG. 10, nose 206 rides by roller 208 as shown in FIG. 10 and eventually clears it. As soon as nose 206 clears roller 208, the resetting fork 214 and arm 210 are returned to the position of FIG. 9 under the influence of spring 224 until the surface 226 of the resetting fork 214 hits pin 228.

On the return (i.e. dial-resetting) trip of the printer actuator knob 22 to the "compute" position, cam shaft 190 rotates in the direction shown by the arrow in FIG. 11. In due course, nose 206 pushes roller 208 downward, but resetting fork 214 is not affected by this movement because the arm 210 pivots counter-clockwise with respect to the resetting fork 214 against the bias of spring 230. As soon as nose 206 clears roller 208 during its clockwise movement, spring 230 brings arm 210 back into the position of FIG. 9, at which time the process can repeat itself.

It will be readily seen that if the tax rate selector mechanism was in the 4% position (FIGS. 10 and 11) to begin with, no rotation of disc 198 will occur during the operation of resetting fork 214, and consequently the tax rate selector mechanism will not be moved. The net result of the above arrangement is, of course, that during the print-out following each delivery, the mechanism automatically resets itself to the 4% tax rate so as to eliminate any error arising from the tax selector mechanism being inadvertently left at an unusual tax rate.

It will be seen that the above described mechanism makes practical the provision of a tax-computing device in which the tax rate can be varied throughout a wide range by small increments merely exchanging a single pair of gears of reasonable size. In addition, the described mechanism provides a simple, effective and versatile and fool-proof mechanism for the computation of taxes on a fluid delivery. It will be readily apparent that the concepts of the invention herein can be carried out in many different ways of which the embodiment shown and described herein is merely illustrative. We, therefore, do not desire to be limited by the embodiment shown and described, but rather to encompass everything within the scope of the following claims.

We claim:
1. A tax-computing metering computer, comprising:
 (a) means for computing the price of a commodity being metered;
 (b) means for computing a selectable percentage of said price;
 (c) means for providing indications of both said percentage and said price plus said percentage; and
 (d) means for selecting said percentage, said means being capable of selecting a percentage of zero and at least two percentages other than zero.

2. The metering computer of claim 1 in which said selection is accomplished by clutch means, and said clutch means are out of contact with their actuating means except while a selection is being made.

3. The metering computer of claim 1 in which said selection means is manually operated, and in which interlock means are provided for preventing operation of said selection means during a metering operation.

4. The metering computer of claim 3, further including resetting means for resetting said selection means to a preset standard percentage following each computation at a non-standard percentage.

5. The metering computer of claim 1 in which the driving mechanism for said percentage-computing means is disconnectable from said input means to produce the percentage of zero.

6. The metering computer of claim 5, further including adjustable stop means for limiting the engagament between said input means and said disconnectable drive means.

7. The metering computer of claim 1, in which said percentage-computing means includes a fixed-ratio gear train for reducing said input means velocity to a velocity on the order of less than 10% of said input means velocity, and a variable-ratio gear train operatively consisting of a single pair of gears interposed between said fixed-ratio train and said combining means.

8. The metering computer of claim 7, in which said single pair of gears have a relative size ratio on the order of less than 5.

9. A metering computer comprising:
an input shaft rotating at a velocity representative of the price of a quantity of fluid being metered;
tax-computing means disconnectably driven from said input shaft at a velocity proportional to a variable percentage of said price;
first output means connected to said tax-computing means and arranged to rotate at a velocity representative of said percentage of said price;
planetary means operably connected to said input shaft and said tax-computing means to combine said velocities into a velocity representative of the price plus the predetermined tax thereon;
second output means connected to said planetary means and arranged to rotate at said combined velocity;
rate selector means for varying said variable percentage;
means connected with said rate selector means for disconnecting said tax-computing means from said input shaft when the tax rate selected is zero; and
interlock means for preventing operation of said rate selector means during a metering operation.

10. The metering computer of claim 9, in which said computer is resettable and has an operational cycle including a homing operation following each computation, and further includes resetting means for resetting said rate selector means to a preset standard percentage during the homing operation following a computation at a non-standard percentage.

11. A metering computer comprising:
means for computing a variable mathematical function of a metered quantity, one variation of which is a predetermined standard function;
manual control means for varying said variable function; and
resetting means for resetting said manual control means to said standard function following a computation in which said variable function is non-standard.

12. A metering computer comprising:
first means for computing a relatively fixed mathematical function of a metered quantity;
second means for computing a relatively variable mathematical function of said metered quantity, one variation of which is a predetermined standard function;
manual control means for varying said variable function;
combining means connected to said first and second means for producing an output representative of a combination of said fixed and variable functions; and
resetting means for resetting said manual control means to said standard function followig a computation in which said variable function is non-standard.

References Cited

UNITED STATES PATENTS

| 3,014,657 | 12/1961 | Sargent et al. | 235—94 |
| 3,121,531 | 2/1964 | Bumpus et al. | 235—61 |

RICHARD B. WILKINSON, *Primary Examiner.*

STANLEY A. WAL, *Assistant Examiner.*